(No Model.)
12 Sheets—Sheet 1.
L. KITTINGER.
MATCH MAKING MACHINE.
No. 341,809. Patented May 11, 1886.
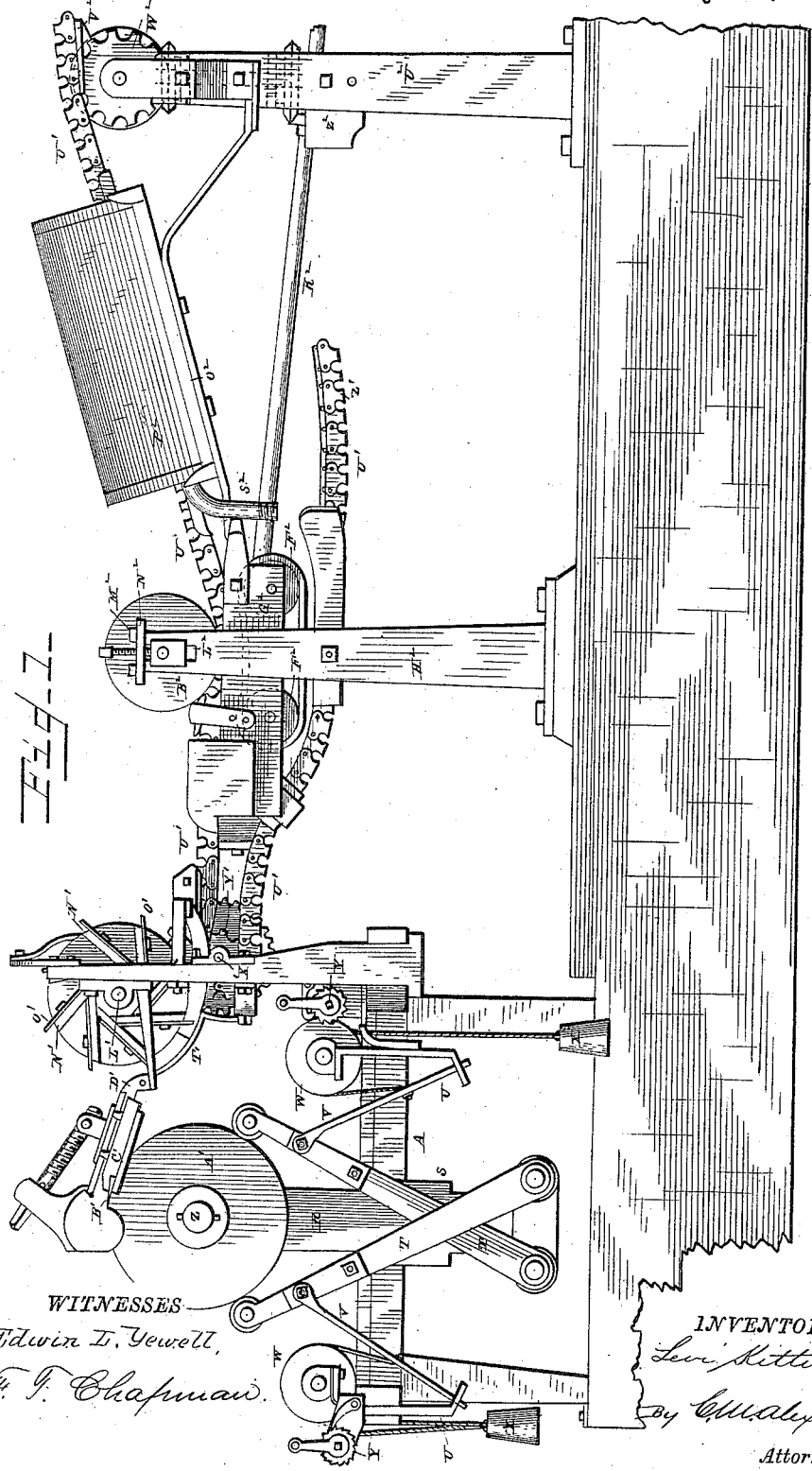
WITNESSES
Edwin L. Yewell,
F. T. Chapman.
INVENTOR
Levi Kittinger
By C. M. Alexander
Attorney

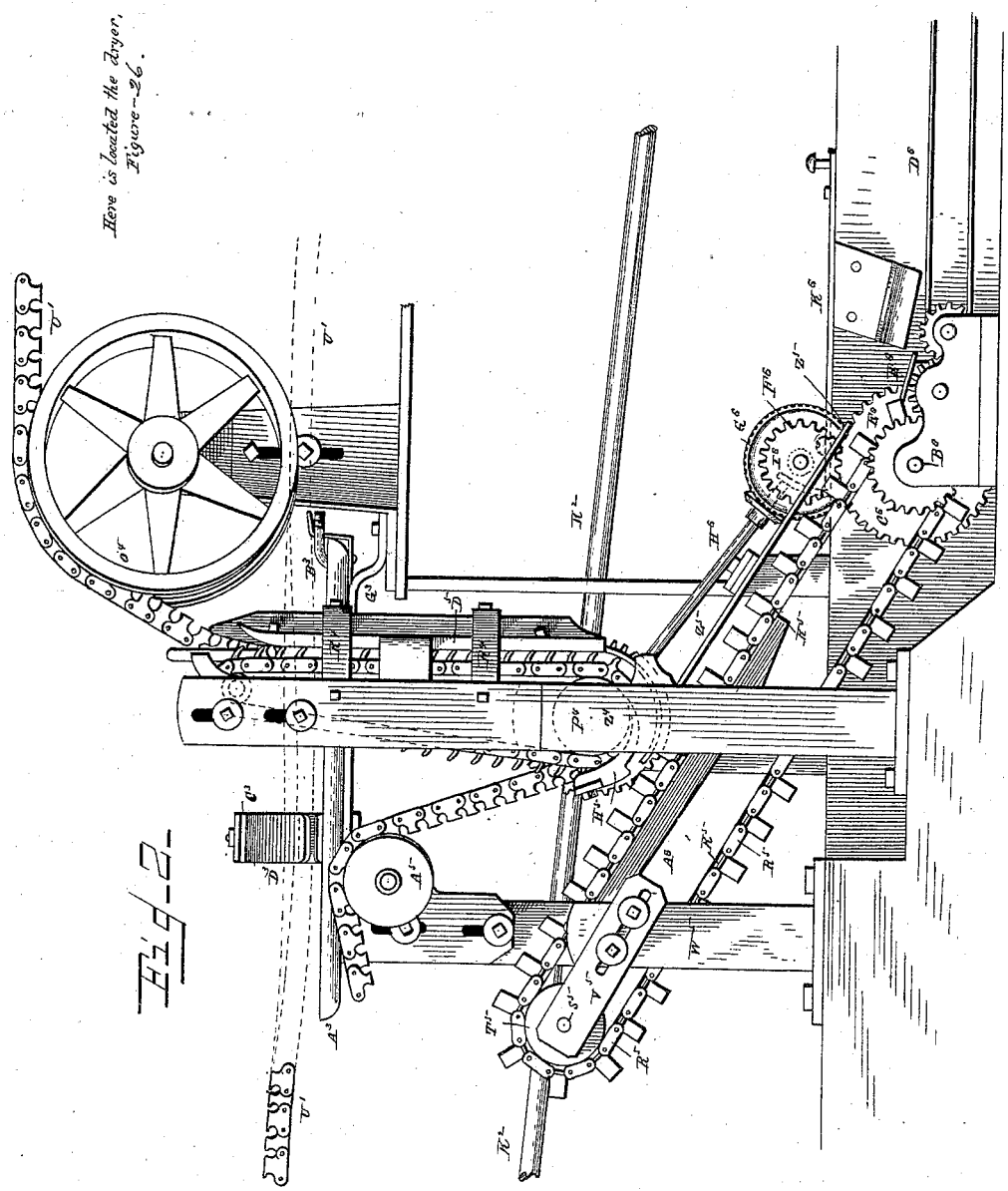

(No Model.)  12 Sheets—Sheet 3.
L. KITTINGER.
MATCH MAKING MACHINE.
No. 341,809. Patented May 11, 1886.
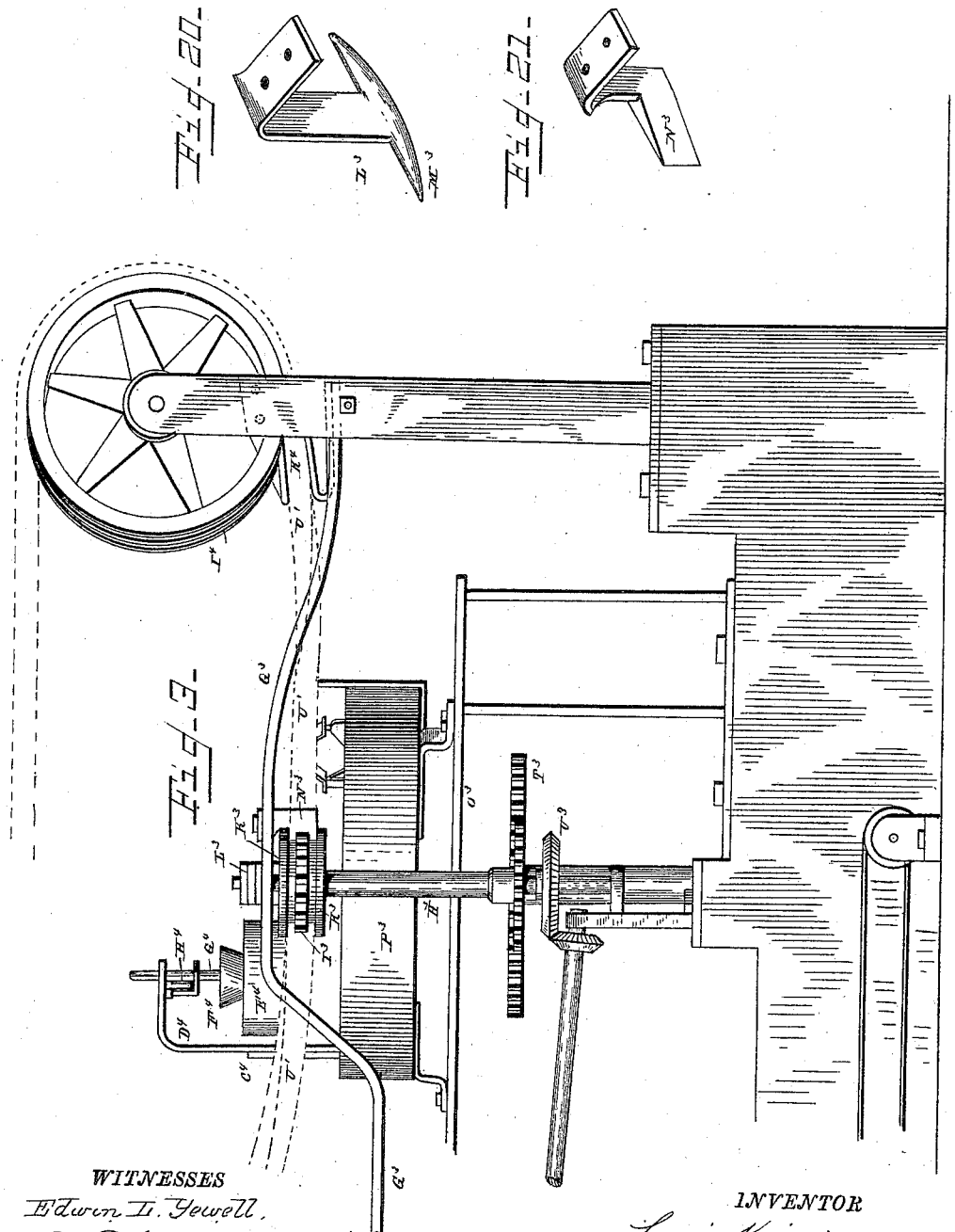
WITNESSES
Edwin H. Yewell
F. T. Chapman
INVENTOR
Levi Kittinger
By C. M. Alexander
Attorney (No Model.)  12 Sheets—Sheet 4.
L. KITTINGER.
MATCH MAKING MACHINE.
No. 341,809. Patented May 11, 1886.
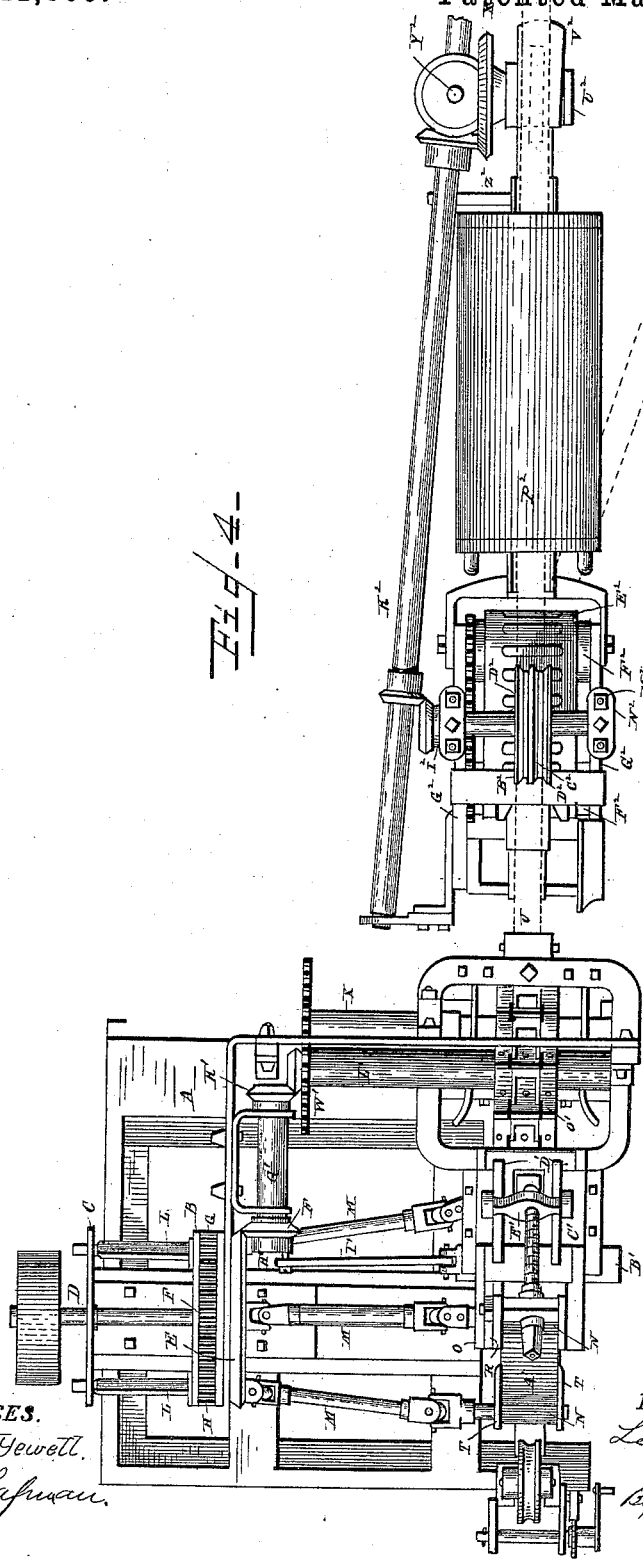
WITNESSES.
Edwin L. Yewell.
F. T. Chapman.
INVENTOR
Levi Kittinger
By C. M. Alexander
Attorney (No Model.)
12 Sheets—Sheet 5.
L. KITTINGER.
MATCH MAKING MACHINE.
No. 341,809.
Patented May 11, 1886.
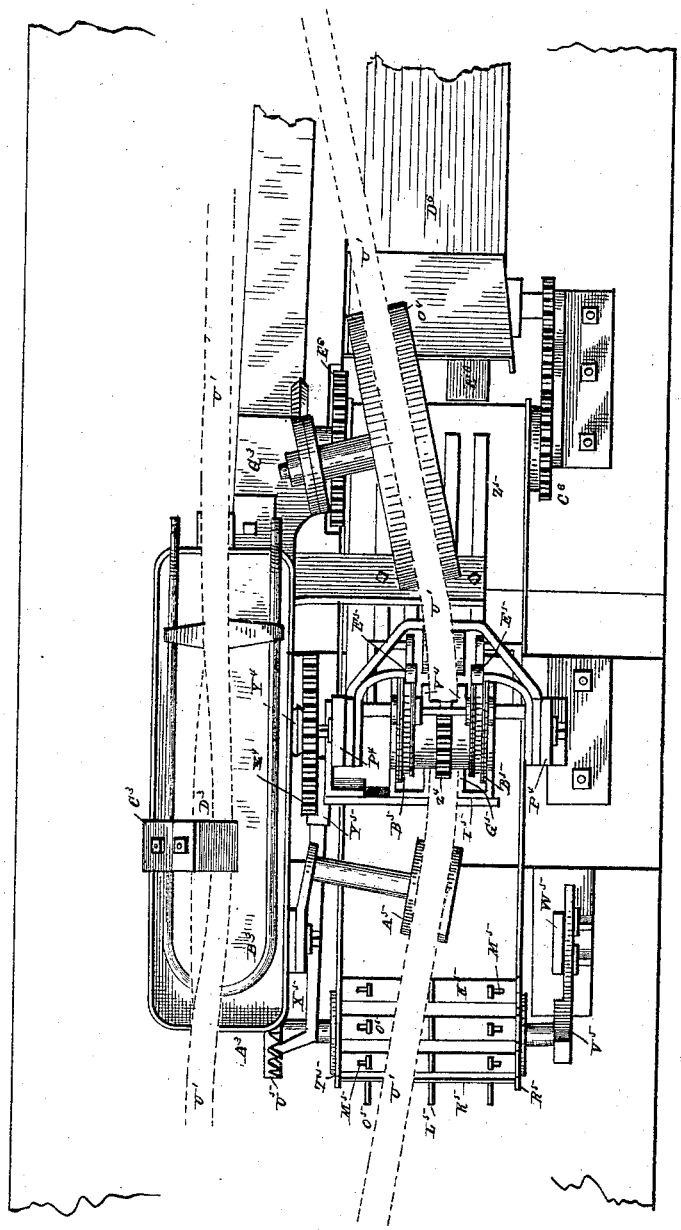
WITNESSES
Edwin L. Yewell.
F. T. Chapman.
INVENTOR
Levi Kittinger
By C. M. Alexander
Attorney (No Model.)  12 Sheets—Sheet 6.
L. KITTINGER.
MATCH MAKING MACHINE.
No. 341,809. Patented May 11, 1886.
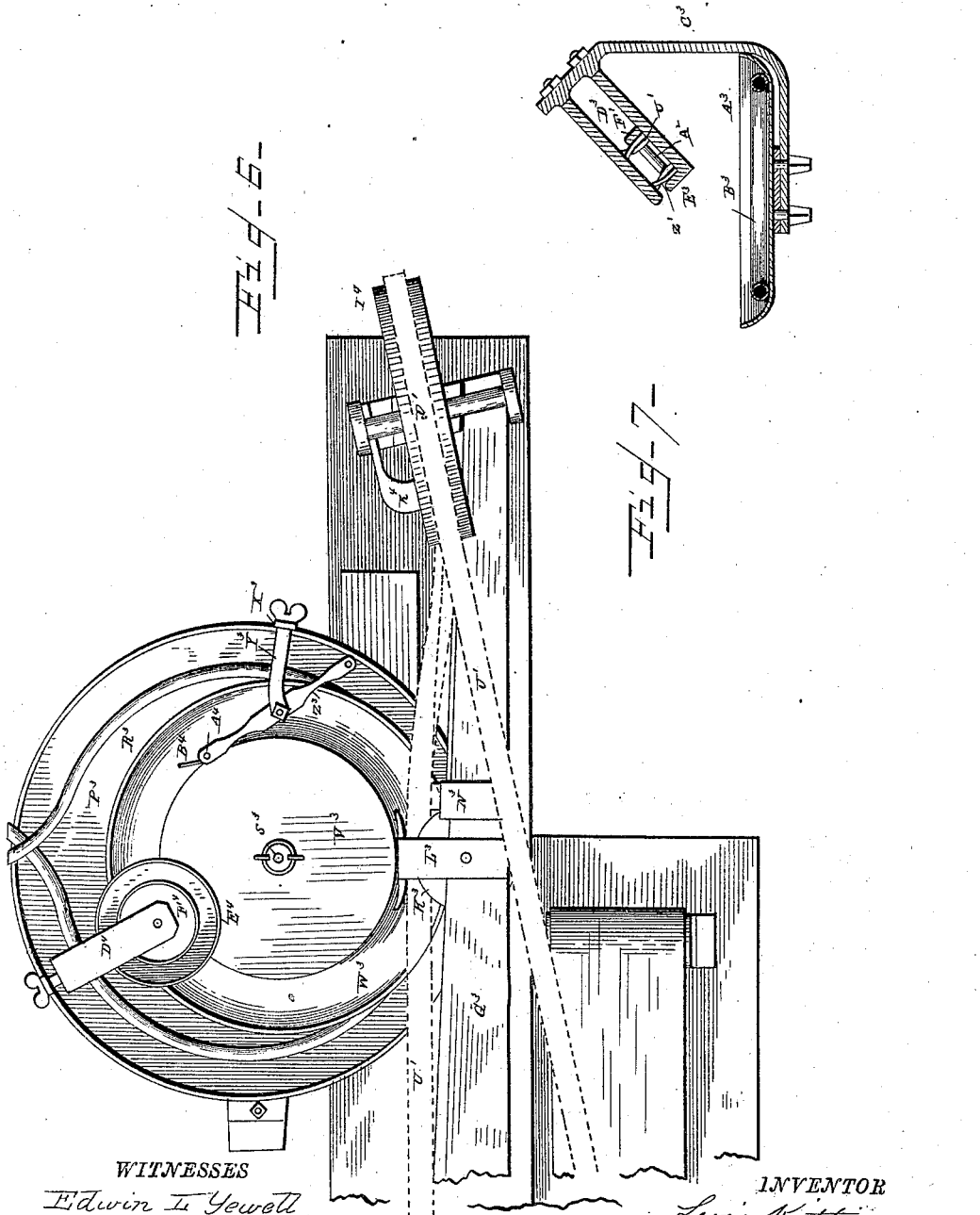
WITNESSES
Edwin T. Yewell
F. T. Chapman.
INVENTOR
Levi Kittinger
By C. M. Alexander
Attorney

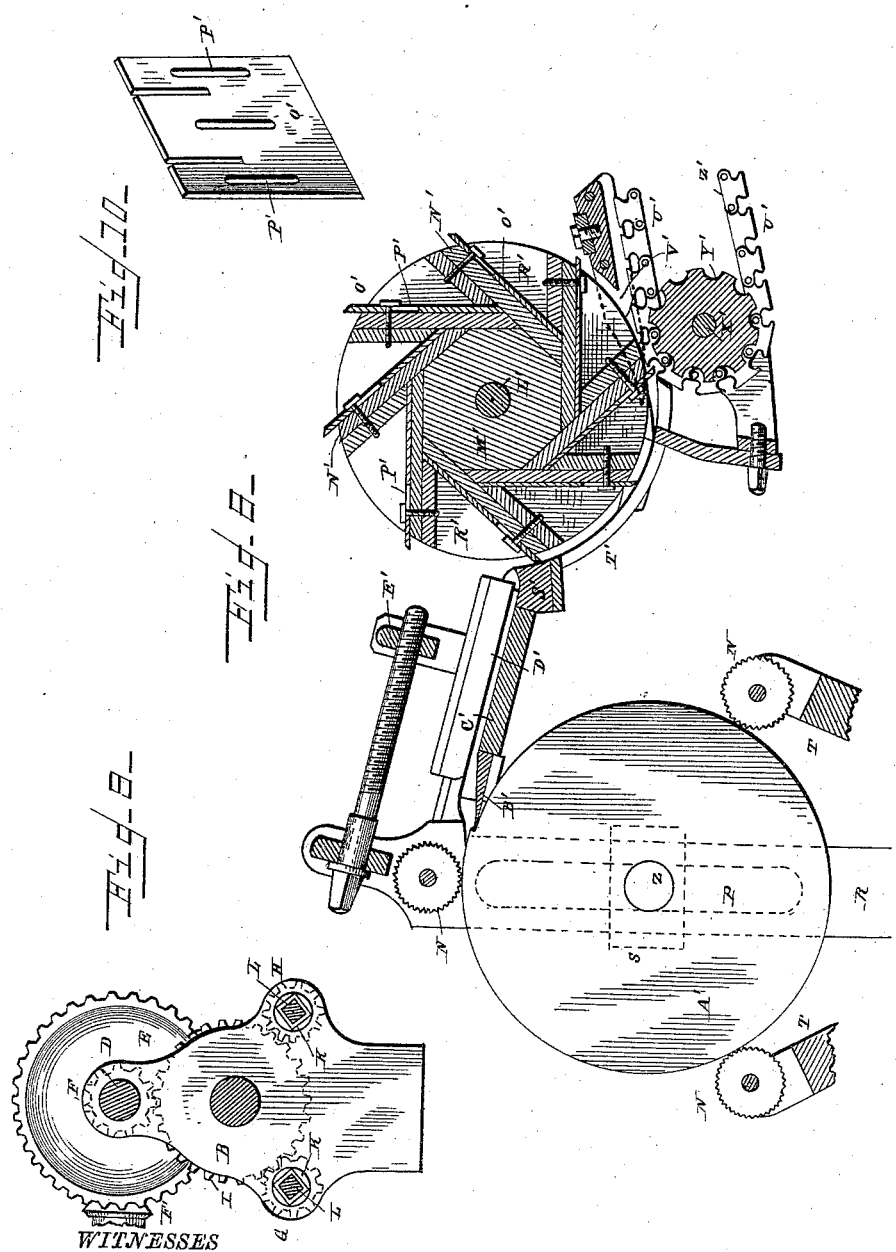

(No Model.)  12 Sheets—Sheet 8.
L. KITTINGER.
MATCH MAKING MACHINE.
No. 341,809. Patented May 11, 1886.
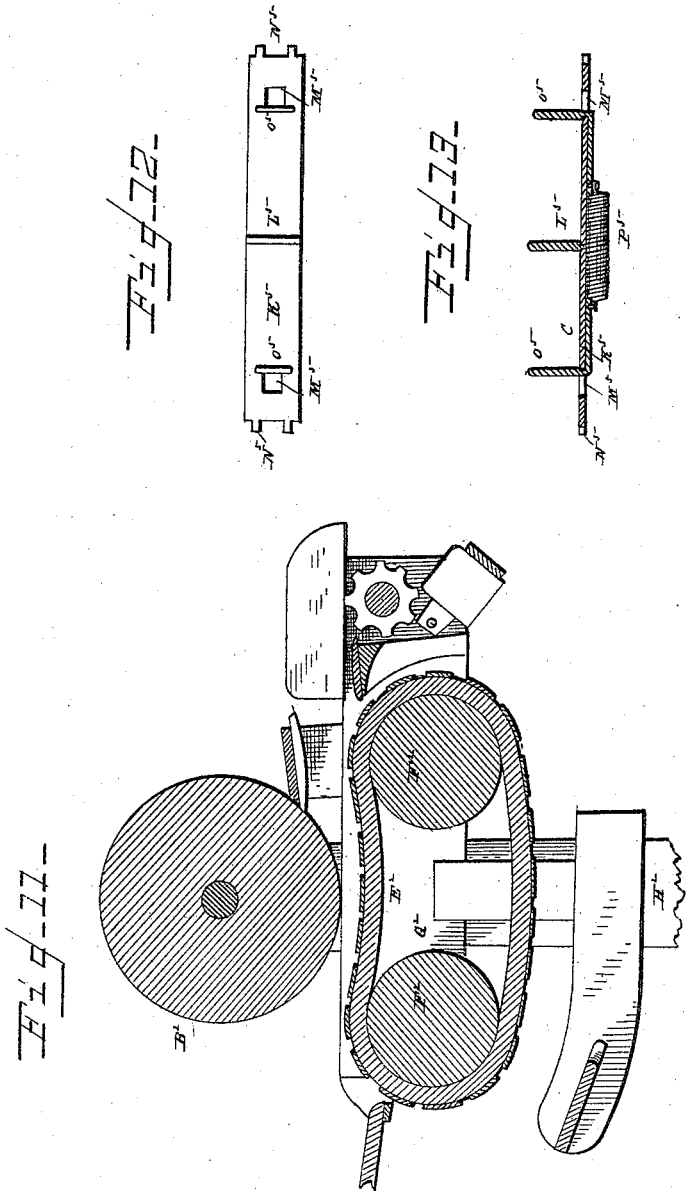
WITNESSES
Edwin L. Yewell.
F. T. Chapman.
INVENTOR
Levi Kittinger
By C. M. Alexander
Attorney (No Model.)  12 Sheets—Sheet 9.
L. KITTINGER.
MATCH MAKING MACHINE.
No. 341,809.  Patented May 11, 1886.
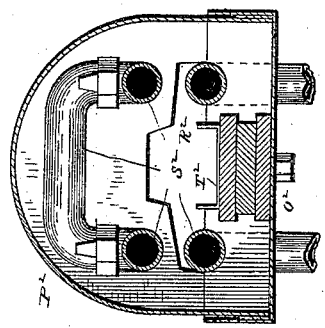
WITNESSES
Edwin I. Yewell,
F. T. Chapman
INVENTOR
Levi Kittinger
By C. M. Alexander
Attorney (No Model.) 12 Sheets—Sheet 10.
L. KITTINGER.
MATCH MAKING MACHINE.
No. 341,809. Patented May 11, 1886.
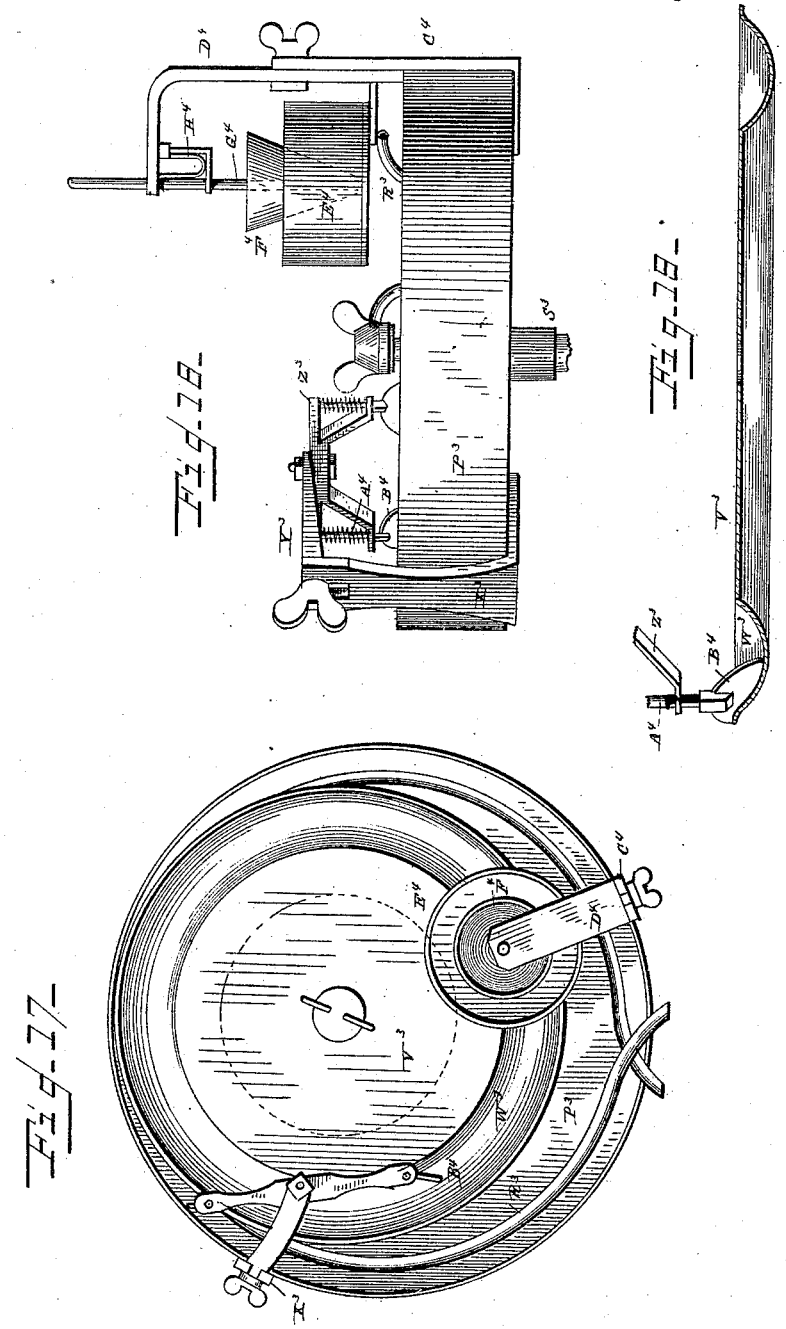
WITNESSES
Edwin L. Yewell,
F. J. Chapman.
INVENTOR
Levi Kittinger
By C. M. Alexander
Attorney (No Model.)  12 Sheets—Sheet 11.
L. KITTINGER.
MATCH MAKING MACHINE.
No. 341,809. Patented May 11, 1886.
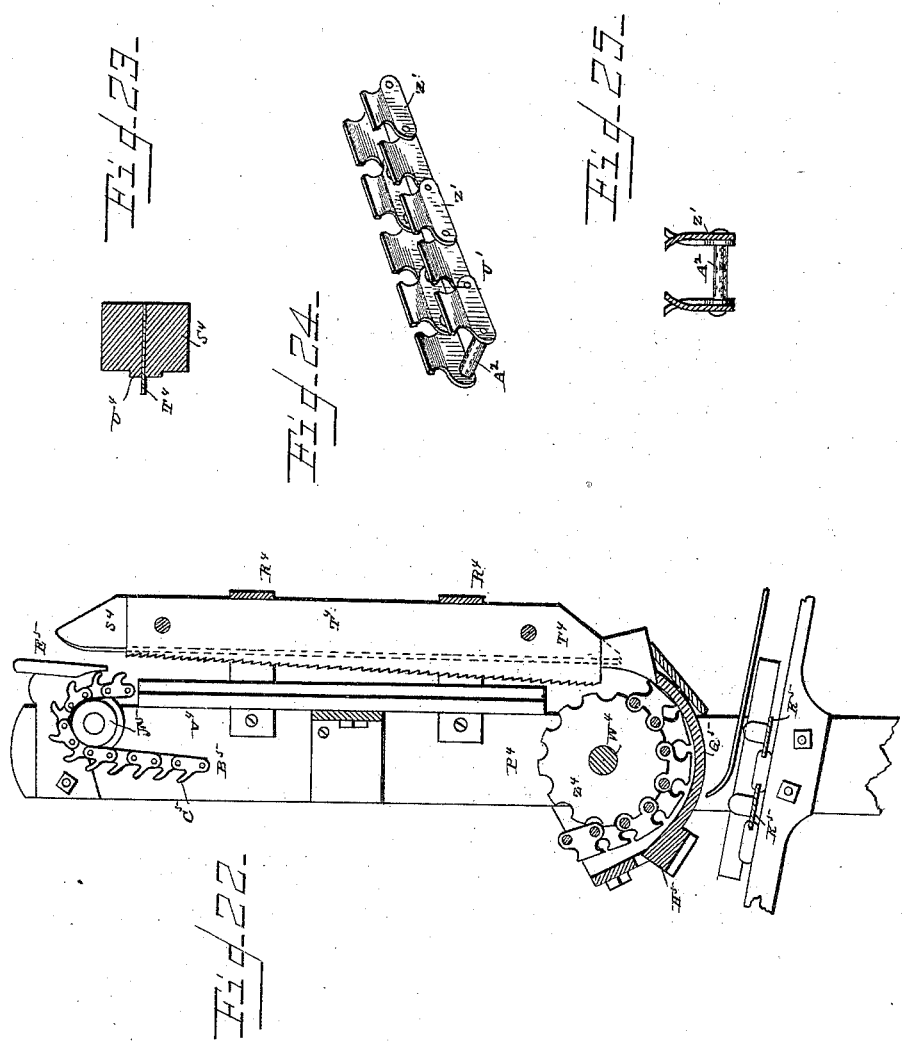
WITNESSES
Edwin L. Yewell,
H. T. Chapman.
INVENTOR
Levi Kittinger
By C. M. Alexander
Attorney (No Model.) 12 Sheets—Sheet 12.
L. KITTINGER.
MATCH MAKING MACHINE.
No. 341,809. Patented May 11, 1886.
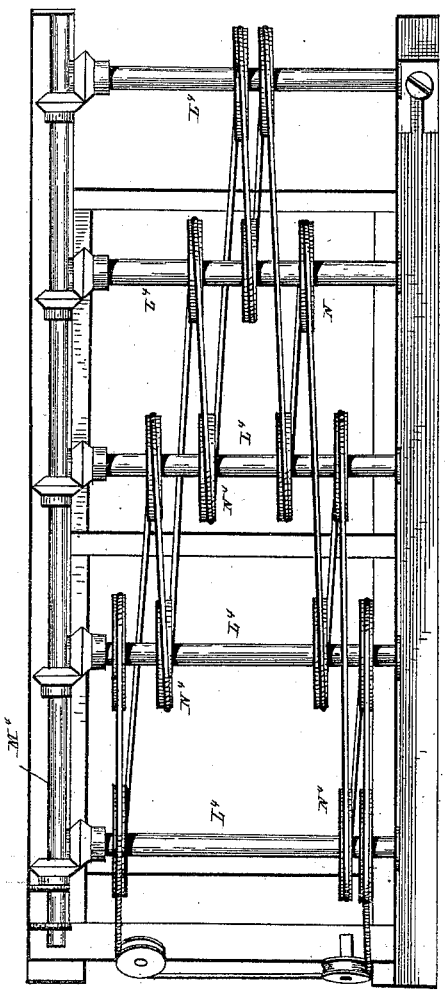
WITNESSES
Edwin L. Yewell
F. T. Chapman.
INVENTOR
Levi Kittinger
By C. M. Alexander
Attorney

UNITED STATES PATENT OFFICE.

LEVI KITTINGER, OF AKRON, OHIO.

MATCH-MAKING MACHINE.

SPECIFICATION forming part of Letters Patent No. 341,809, dated May 11, 1886.

Application filed October 29, 1885. Serial No. 181,316. (No model.)

*To all whom it may concern:*

Be it known that I, LEVI KITTINGER, a citizen of the United States, residing at Akron, in the county of Summit and State of Ohio, have invented certain new and useful Improvements in Match-Making Machines, of which the following is a specification, reference being had therein to the accompanying drawings.

My invention relates to improvements in machines for making matches, and is designed to produce an automatic mechanism that shall perform all the operations of match-making, from that of producing the sticks to that by which the matches are finally finished and boxed.

The several operations necessary to produce a finished match are as follows, the machine automatically performing them all: First, from a cylindrical piece of wood, equal in length to that of two matches placed end to end, is cut a thin slice of the constant thickness of a match, and in one continuous piece, till the said block is entirely consumed; second, the slice is cut into sticks, square in cross-section, and deposited on a carrier that firmly holds each stick; third, the sticks are creased laterally and centrally to prevent them falling from the carrier when dipped; fourth, the sticks are passed through a heating-chamber; fifth, each end of the sticks receives the first dip, which is in a pan of paraffine or other suitable substance; sixth, the sticks are then given the second or final dip, each end being dipped as before, this latter dip coating the ends of the sticks with the igniting material, after which the sticks become double matches; seventh, the matches are then carried back and forth by suitable mechanism, which may be termed the "drier," till the composition on the ends is thoroughly dried; eighth, the dried matches are then carried to the cutter, which divides the stick into two equal parts; ninth, from the cutter the matches fall into boxes, which may be those in which the matches are sold or merely temporary boxes, to be transferred to the permanent boxes by hand, the latter being the preferred mode; tenth, the boxed matches are then transferred by means of a suitable carrying device to a suitable place for transfer, packing, and shipment.

The mechanisms I employ for these various operations, and which seem best adapted for carrying out my invention, are illustrated in the annexed drawings, in which—

Figures 1, 2, and 3 represent a side elevation of the device, the drier being omitted, but its place indicated; Figs. 4, 5, and 6, a plan view of the same; Fig. 7, a cross-section through the first dip-pan, showing a means of accomplishing the dipping; Fig. 8, an enlarged section, taken in a longitudinal vertical plane of the slicer and stick-cutter acting on the said slice; Fig. 9, a side elevation, partially in section, of the transmitting-gear pertaining to Fig. 8; Fig. 10, a perspective of one of the knives of the stick-cutter acting on the slice; Fig. 11, an enlarged longitudinal vertical section through the creaser; Fig. 12, a plan view of one of the clamps on the match-box carrier; Fig. 13, a longitudinal vertical section of the same; Fig. 14, a vertical longitudinal section of the heating-chamber; Fig. 15, a plan view of the same with the top removed; Fig. 16, a cross-section of the same; Fig. 17, a plan view of the composition-pan; Fig. 18, a side elevation of the same; Fig. 19, a cross-section of the revolving composition-holder, showing one of the stirrers; Figs. 20 and 21, detail perspectives of the carrier-guides, whereby the carrier is made to dip the match ends in the composition pans; Fig. 22, a vertical section through the mechanism whereby the sticks are cut into two pieces, and designated the "divider"; Fig. 23, a cross-section of the saw-clamp and saw contained therein; Fig. 24, a perspective of the stick-carrier chain; Fig. 25, a cross-section thereof, and Fig. 26 a diagrammatic plan view of the drier.

Upon one side of a suitable platform, A, is raised a standard, B, and a standard, C. Journaled at the top of these standards is a drive-shaft, D, containing at its outer end a pulley and at its inner end a large bevel-gear, E, with a pinion, F, just anterior to it and contained within the divided upper portion of the said standard B. Within the said standard, below the pinion F, are the pinions G and H, having a common connection with the said pinion F by means of the intermediate gear, I, the said pinions F, G, and H being equidistant one from the other, and by means of the gear I having an equal speed of rotation.

On the pinions G and H are collars K, which rest in the divided portion of the standard B, and form spindles for the said pinions. These collars or sleeves K are provided with central squared passages for the shafts L, or the equivalent construction. Round shafts and keys may be used. The shafts are journaled also in the standard C, and have the ends that project through the pinions connected by universal joints to connecting-shafts M, which latter connect by universal joints to the shafts of the friction-rollers N.

Upon the main frame, opposite the standards B C, is raised a standard, O, having a central slot, P, the said standard also extending below the platform A. On this standard O moves vertically a strip, R, near each end of which is a collar, S, surrounding the said standard O, and keeping the said strip in a snug engagement with the same. To the lower end of this strip are pivoted the arms T, in the upper ends of which are journaled the shafts of two of the rollers N, the said rollers resting in the forked end of said arms.

On the side of the platform occupied by said arms T, and located at or near each end thereof, is a frame, U, with a downward continuation, with a slot for the passage of guide-rods V, pivoted to the arms T. The upper end of this frame carries a pulley, W, over which passes a cord or chain from the rod V to a weight, X, a windlass, Y, having connection to said weight, operating to raise the same. The weights tend to keep the arms advanced toward the vertical, while the windlasses, by raising the weights, operate to allow the said arms to fall.

Secured to the strip R, and passing through the slot P, is a spindle, Z, on which is secured a block of wood, A', of cylindrical shape and of a length equal to that of two matches placed end to end. When in position, the upper edge of the said block rests against the upper roller, N, and the lower or movable rollers keep it in the said position. Engaging with said block, at such an angle as to cut or peel a slice from the periphery thereof, is a knife, B', set in a frame, C', that slides on a frame, D', and is set or moved by means of a screw-shaft supported by an upward extension of the standard O, and having its threaded portion engaging in a pivoted block, E', on the sliding frame C'. The thickness of the slice is regulated by the distance of the knife-edge from the vertical central plane of the block A'.

At right angles to the shaft D, and engaging with the bevel-gear E by means of a bevel-pinion, F', is a shaft, G', carrying at the end occupied by the said pinion F' a disk, H', on which is a wrist-pin, to which is connected the pitman I', passing to the knife B' and imparting thereto a reciprocatory movement, and at the other end of said shaft G' is a pinion, K', imparting motion to the shaft L', on which is the cutter-head which divides the slice cut from the block into sticks. The said cutter-head consists of a hub, M', with as many sides as there are knives to be used, eight being shown in the drawings. (See Fig. 8.) On the faces of this hub are placed the tangent arms N', which form supports for the knives O', and to which said knives are bolted, the bolts passing through slots P' therein, so that the knives may be adjusted.

Between each knife is placed a stay-frame, R', having its outer edge arc-shaped and coincident with the ends of the tangent arms N', the knives projecting beyond them.

Across the edge of the frame D', where it approaches the cutter-head, is arranged a strip with a cutting-edge, S', over which the slice cut from the block passes and abuts against the arc-shaped edge of the frame R', which acts as a stop for said slice. The knives O' successively cut sticks from the said slice, said knives projecting on each side of the frames R' and being equal in width to the slice, which is of a width equal to the length of two matches.

From the frame D' extends a curved frame, T', which acts as a support for the sticks while being advanced by the knives O', being curved from the same center as is the periphery of the cutter-head and ending at a point coincident with the carrier-chain U'.

Fitting in close proximity to the outer sides of the frames R', at the lower part of the said cutter-head, and resting in slots in the knives O', but being stationary, are plates V', with slightly-rounded lower edges and ending in a point slightly above the lower arc-shaped edges of the said frames R'. These plates are so placed as to cause the stick to pass under them, directing its course into the carrier-chain.

On the shaft L' is a gear, W', meshing with a gear on a shaft, X', parallel with the said shaft L', and carrying a sprocket-wheel, Y', under the cutter-head, and around which the chain U' passes and receives motion.

The carrier-chain U' consists of a double series of links, Z', connected pivotally by the cross-rods A². Each of the links is stamped from sheet metal and recessed at the ends, so that when pivoted together and in line one with the other, an opening, circular or other shape, according to the shape of the recess, is left between each link. The portions of the links extending to one side of the pivotal points are bent at an angle to the main portion, the relatively outer links being bent inward, and the inner links outward in order to bring the said portions more nearly in a position that will hold the match-sticks better.

The carrier-chain extends entirely through the machine, as will be set forth in connection with the various steps incident to the formation of the match. In the drawings this chain is shown in several figures, in dotted lines, as tending the least to confuse.

The match-stick having been deposited in the carrier by the mechanism described in connection with the cutter-head, and prevented from lateral movement by the shape of the recesses in the links which clasp the said stick, a means must be provided for preventing longitudinal movement during the process of dipping the stick in the compositions. A mechanism for accomplishing this operation is shown in Figs. 1, 4, and 11. The carrier-chain is directed by suitable guides under a wheel, B², with a central flange, C², which rests between the double links of the chain, and a flange, D², on each edge, between which flanges and the central flange the links pass. The central and edge flanges rest on or engage with the sticks and slightly mash them, spreading the wood on each side of the links sufficiently to prevent longitudinal movement of the said sticks. The rods A², resting directly under the sticks, prevent the same from being broken. As it is necessary for the chain to yield slightly while passing under the creaser, it at this point rests or travels on a belt, E², preferably of leather, and protected by metallic bands on its bearing-surface. This belt travels around the pulleys F², the shafts of which are journaled in a suitable frame, G², supported by the standards H², and have gears on one end driven by a gear-carrying shaft, I², which receives its motion from a main drive-shaft, K², which latter will be more particularly referred to hereinafter. The tops of the standards H² are slotted, as shown at L², and contain the bearing-boxes of the shaft of the wheel B², said boxes sliding in said slots and being borne upon by the set-screws M², which are held by the cap-pieces N² on the top of said standards. From the creaser the chain carries the match-sticks to the heater, which is shown in detail in Figs. 14, 15, and 16, and to which reference is especially had in the description. The base of the heater consists of an oblong pan, O², in which fits a dome cover, P², having end openings or recesses, R², Fig. 16.

Within the heater-chamber is contained a steam-heating pipe, S², entering through one of the recessed ends, and consisting of two longitudinal sections on each side of said chamber, and connected at the ends so as to produce a continuous line of piping. Upon a suitable support on the bottom of the heater rests a longitudinally-located trough, T², extending beyond each end of the heating-chamber and forming a guiding-support for the carrier-chain. The trough enters and leaves the heating-chamber through the openings or recesses R².

The heater may be of sufficient length to thoroughly heat and dry the match-sticks preparatory to their being dipped in the igniting composition.

In the drawings, Fig. 1, the heater is shown in an inclined position, which is nearly arbitrary, and supported at one end by the standards H² and at the other by a standard, U². On top this standard U², Figs. 1 and 4, is a supporting-guide, V², for the chain, and a sprocket-wheel, W², projecting through said guide and engaging with the chain to aid in impelling it forward. On the end of the sprocket-wheel shaft is a pinion, X², which engages with a pinion on the upright shaft Y², journaled on the said standard U² and having gear-connection with the drive-shaft K², which is supported at this point by a bracket, Z², as shown in Fig. 4. From the sprocket-wheel W² the chain passes over the pan A³, which is oblong, as shown, by preference, and contains the steam-pipe B³ for keeping the contents (paraffine or other substance in which the match is first dipped) in a liquid state. A standard or bracket, C³, with the upper end at an angle (say forty-five degrees) to the vertical projects over the pan from each side and carries a guide, D³, for the carrier-chain. This guide consists of two parallel strips, one of which has an upturned end, E³, and an intermediate tongue, F³. Between the end E³ and the tongue F³ is the path of said chain, as is evident from Fig. 7. The guide being supported at an angle, the chain in passing therethrough will of a necessity assume the same angle and cause the ends of the stick to dip in the contents of the pan, thus causing the ends of the said stick to become coated with the material.

In the drawings the guide is shown on one side of the pan only, on account of the contracted space, the other guide and its operation being an exact counterpart of the one shown.

The pan A³ is supported upon the frame G³, which supports other portions of the mechanism of the machine, as hereinafter set forth.

On the upper end of an upright shaft, H³, having the said upper end journaled in the frame G³, is a sprocket-wheel, I³, having an annular flange, K³, on each side the teeth for the guidance of the chain which engages with the said wheel. The chain which engages with the sprocket-wheel at right angles to its normal position, and hence carries the match-sticks in an upright position at this point, is kept in engagement with said wheel by a guide, L³, Figs. 3, 6, and 20, which is secured to the frame G³, and has a lateral flange, M³, which engages under one edge of the chain sufficiently to prevent any side movement of the stick. A wedge-shaped guide, N³, Figs. 3, 6, and 21, engages with the back of the chain and prevents the sprocket-wheel from fouling with said chain.

Upon a suitable frame, O³, is supported a stationary pan, P³, containing a steam-pipe, R³. Through this pan projects one end of a shaft, S³, carrying below the same a large gear, T³, engaging with a pinion on the shaft H³, which latter receives motion from a gear-connection, U³, with the drive-shaft K², which is shown as ending and properly journaled at this point. (See Fig. 3.) The end of the shaft $S^3$ which projects through the pan $P^3$ carries a disk, $V^3$, with a peripheral groove or depression, $W^3$, for receiving the composition in which the match is the second or last time dipped. As the shaft $S^3$ revolves, the disk $V^3$ also revolves in a direction corresponding to the travel of the chain, so that as the match-stick is dipped therein it will not drag through the composition, but enter and leave the same as it would if hand-dipped.

On one side of the pan $P^3$ is erected a support, $X^3$, with a slot in its upper end (see Fig. 18) for the reception and vertical adjustment of an arm, $Y^3$, held in said slot by a thumb-nut. On the end of this arm is hung a frame, $Z^3$, with V-shaped continuations which hold the spring-surrounded rods $A^4$, squared at their lower ends to prevent turning in their bearings, (see Fig. 19,) and carrying the scraping-plates $B^4$, which have their lower edges resting on and conforming to the shape of the sides of the groove $W^3$—one resting on the exterior edge or side of the groove and one on the interior side. The purpose of these plates is to prevent the composition from burning or caking on the bottom, the steam-pipe $R^3$, encircling the pan $P^3$ under the groove, supplying sufficient heat to keep the said composition in a liquid state. The said plates $B^4$ are placed at an angle to the line of rotation of the disk, so as to throw the said composition continuously toward the center of the groove, at which portion thereof the sticks are dipped.

On one side of the pan $P^3$ is raised a slotted standard, $C^4$, retaining adjustably an angle-arm, $D^4$, the lower part of which has secured to it a receptacle, $E^4$, having centrally a funnel, $F^4$, resting over the groove $W^3$. From the angle portion of the arm $D^4$ is suspended a longitudinally-adjustable plunger, $G^4$, which regulates the size of the funnel-opening.

The receptacle $E^4$, as well as the pan $P^3$, is filled with warm water for liquefying the composition, and the plunger $G^4$ regulates the flow thereof from the funnel in which it is received to the groove $W^3$, a spring, $H^4$, supported by a suitable frame on the arm $D^4$ retaining the said plunger in its adjusted position.

In practice the match-stick will be dipped at both ends in the composition, and assumes a perpendicular position, so that the said dip may be even. From this point the chain is carried over a drum, $I^4$, a guide, $K^4$, being provided to better direct its movement to said drum, and from thence to the drier, Fig. 26. The figure representing the drier is merely diagrammatic. It consists of a series of parallel shafts, $L^4$, revolved at the same speed by a common drive-shaft, $M^4$, connected to each by bevel-gearing. On each of these shafts are drums $N^4$, similar to the drums $I^4$, and so arranged as to carry the chain back and forth till the matches are thoroughly dried, which takes from fifteen to thirty minutes. One of the end shafts has adjustable bearings to take up the slack of the chain when the machine is set up.

In Fig. 26 the drums are so arranged as to carry the chain forward a distance equal to that of two shafts and then back to the one passed, and so on till the chain has been carried through the drier and back again; and this operation is accomplished by arranging the drums in pairs, except on the first and last shaft, and placing the said pairs at constantly-increasing distances from the corresponding ends of the said shafts. On the next to the last shaft are shown three drums, but the central drum of the three acts with either of the side drums, according to which direction the carrier is traveling. Having passed through the drier, the carrier on its return travel passes over drums that constantly approach nearer the ends of the shaft. While it is clearly evident that the said drums may be arranged in larger groups than twos, still, unless the length of the drier is objectionable, the arrangement shown is desirable.

From the drier the chain passes over a drum, $O^4$, and to the cutting mechanism for cutting the sticks centrally and forming two matches of each stick. This mechanism, which may be termed the "divider," is shown in Figs. 2, 5, 22, and 23. Two standards, $P^4$, are erected in line with the travel of the chain after leaving the drum $O^4$, and by means of suitable brackets, $R^4$, retain the clamping-pieces $S^4$, which hold the saw-blade $T^4$ firmly between them and perpendicularly. These clamp-blocks $S^4$ have, coincident with the saw, the shoulders $U^4$, which act as guides for the chain, and prevent lateral motion thereof as the match-sticks are carried along the said saw. The saw $T^4$ is wider at the lower end than at the upper, and the teeth project upward, so that the sticks are slowly cut through as they are carried along said teeth. The chain is kept snugly against the blocks $S^4$ by the guides $V^4$, held by the standards $P^4$, and resting against the back of the chain.

Near the bottom of the saw is journaled in the standards the shaft $W^4$, having a gear, $X^4$, meshing with a gear, $Y^4$, on the drive-shaft $K^2$. This shaft carries coincident with the saw-holder the sprocket-wheels $Z^4$, there being a central wheel and one each side thereof. Around the central one passes the chain, which extends upward to a pulley, $A^5$, and thence to the point where it receives the sticks from the cutter-head.

On each side of the chain where it carries the matches over the saw are arranged the sprocket-chains $B^5$, with the links on one side provided with spur-shaped continuations $C^5$. These chains pass around the outer sprocket-wheels, $Z^4$, and in front the guide-strips $D^5$, placed parallel with the saw-clamping blocks $S^4$, and on each side thereof, and having their front edges flush with the faces of said blocks. This construction shows best in Figs. 2 and 5. A short guiding-bracket, $E^5$, is placed just in front the upper ends of the strips $D^5$, and between the same and the chains B⁵. The upper portions of the said chains are supported by pulleys F⁵, and the said chains are so arranged as to cause the spurs to engage the ends of the sticks as they are carried over the saw. While passing around the sprocket-wheels Z⁴ the chains pass over the surface of an arc-shaped frame, G⁵, with a central continuation, H⁵, Fig. 22, the main frame terminating on a line with the edge of the wheels Z⁴, as shown best in Fig. 2. Resting partially over this frame G⁵ are the arms of a bracket, I⁵, supported by the standards P⁴. As the chain passes over the central sprocket-wheel, Z⁴, the links are opened and the matches dropped on frame G⁵, along which they are carried, partially by the links of the carrier-chain and partially by the spurs on the side or auxiliary chain, B⁵, till reaching the end of said frame and prevented from upward travel by the bracket I⁵, the said matches are dropped therefrom into boxes ready to receive them. The central continuation, H⁵, projects slightly below the said frame and is centrally recessed on its under side, Fig. 22, for a purpose hereinafter set forth, the continuation itself preventing the inner ends of the said matches from engaging, and insuring the proper delivery to the boxes under each side of said frame G⁵.

The box-carrier, as shown in Figs. 2, 5, 12, 13, and 22, consists of a series of plates, K⁵, (see especially Figs. 12 and 13,) each having a central flange, L⁵, laterally across it, slots M⁵, near each end, and teats or lugs N⁵, projecting from the said ends. Passing through the slots are the clamp-pieces O⁵, each connected to a central spring, P⁵, under the plate K⁵. These plates K⁵ are connected at the ends by links R⁵, engaging over the teats or lugs N⁵, the whole forming a flexible belt. (See Figs. 2, 5, and 22.)

The box-carrier is placed at an angle of about forty-five degrees, as shown in Fig. 2, the upper end being supported on a shaft, S⁵, carrying sprocket-wheels T⁵, and at one end a ratchet-wheel, U⁵, Fig. 5, beyond the said carrier. The said shaft S⁵ is journaled in bearings V⁵, adjustable on the supporting-posts W⁵.

In the teeth of the wheel U⁵ engages the pawl end of a lever, X⁵, the other end being formed into a striking-head, Y⁵, Fig. 5, which engages against the side of the said box-carrier. When in operation, the boxes are held on the carrier by being clamped between the central flanges and the clamp-pieces on strips or plates K⁵, and the matches as they drop therein are caused to settle into place by the tapping of the head of the lever X⁵ on the said carrier, thereby jarring the same. The inner edges of the boxes pass under the central continuation, H⁵, and through the recess therein. The matches are prevented from rolling from out the boxes, as they are considerably inclined by the frames Z⁵, which rest directly over the said carrier from a point directly under the saw to the end of the said carrier, thus enabling them to perform their office satisfactorily. The carrier is prevented from sagging when under the saw and receiving the matches by means of the guide-strips A⁶, secured to the inner sides of the standards P⁴. The lower end of said carrier is supported by means of sprocket-wheels on a shaft, B⁶, and receives its motion therefrom. On one end of this shaft is secured a gear-wheel, C⁶, which, by means of an intermediate gear, imparts motion to a drum around which the transmitting-belt D⁶ passes. This belt receives the boxes from the box-carrier, two small platforms, E⁶, filling the intervening space between the said carrier and the belt D⁶, so as to direct the boxes properly, and carries the filled boxes to another room, in practice, where they are transferred to the boxes in which they are sold, and are then packed for transportation. The machine will deliver the matches to the boxes in which they are sold; but as the boxes then have to be accurately constructed, it has been found better and cheaper to use correctly-made boxes—say of tin—and afterward transfer them to the usual boxes. The shaft B⁶ also carries a gear, E⁶, which meshes with a gear, F⁶, on a short shaft, which also carries a bevel-gear, G⁶. A shaft, H⁶, connects with the main drive-shaft K², and at its lower end is journaled in the upturned end I⁶ of a lever, K⁶. The said shaft also carries at the said lower end a bevel-gear, L⁶, which may, by means of the said lever, be moved in or out of gear with the bevel-gear G⁶. By this means the box-carrier may be stopped without stopping the remainder of the machine.

As the operations of the several parts have been set forth in connection with the description of the mechanism, it will be sufficient to merely sum up briefly the several operations of the machine as a whole in producing matches from a block of wood and boxing them. A cylinder of wood having been placed properly in the machine, it is cut into a continuous slice of the proper thickness from the periphery of said block. The slice is cut into sticks and deposited in a carrier-chain, which carries them through a heating-chamber, dips both ends of the said sticks, first in paraffine, then in the igniting composition, then through the drier, which consists of a series of drums over which said chain passes, then to the divider, which cuts the sticks into two pieces. From thence the sticks fall into boxes slowly carried under the divider, and, with the boxes, are carried from the machine.

I claim—

1. A machine for making matches, consisting of a splinting mechanism in which are knives or cutters acting upon a block of wood to reduce it to splints, a match-carrier on which the said splints are deposited by the splinting mechanism, composition-pans to which the carrier conveys the splints and into which the said splints are dipped, a drier consisting of a series of drums over which the carrier passes after dipping the splints, and a cutter over which the carrier conveys the dried splints to divide them into two pieces, the whole operation being automatic and continuous, substantially as specified.

2. A machine for forming matches, consisting of a splint-making mechanism in which are cutters or knives for reducing a block of wood to splints, a match-carrier receiving said splints, a heating-chamber through which said carrier conveys the splints, composition-pans in the line of travel of the said carrier, and into which the carrier dips the splints, a series of drums over which the carrier conveys the matches after they are dipped, a cutter over which said carrier conveys the matches after being dried to divide them in two pieces, and a box-carrier traveling under said cutter to receive the matches, the entire operation being continuous and automatic, substantially as specified.

3. In a match-machine, a splint-making mechanism consisting of an adjustable holder for the wooden block, a reciprocating knife traveling across said block for cutting a continuous slice from the same, and a revolving cutter-head carrying a series of knives for dividing the said slice into sticks after leaving said block, substantially as specified.

4. In the splint-former of a match-machine, a block-holder consisting of a movable support for the said block, arms pivoted to said support and acted upon by weights, and revolving friction-rollers journaled in the free ends of said arms and normally engaging said block, substantially as specified.

5. In the splint-former of a match-machine, a block-holder consisting of a spindle on a movable support, arms pivoted to said support, guide-rods pivoted to said arms, weights acting to force said rods and arms upward, and revolving friction-rollers journaled in the free ends of said arms and causing said block to rotate, substantially as specified.

6. In a splint-former of a match-machine, a block-actuating mechanism consisting of pivoted arms with friction-rollers journaled in them, and longitudinally-moving shafts connected by universal joints to said rollers, said shafts moving in pinions having common connection to a driving mechanism, substantially as specified.

7. In the splinting mechanism of a match-machine, an automatically-adjustable block-holder, friction-rollers for revolving the said block, and also adjustable, and a reciprocating knife in adjustable bearings for cutting a continuous slice from said block, substantially as specified.

8. In the splinting mechanism of a match-machine, a cutter-head carrying a series of knives, in combination with a carrier-chain into which said cutter-head deposits the splints or sticks, substantially as specified.

9. In the splinting mechanism of a match-machine, a cutter-head with slotted knives combined with a curved frame for the conveyance of the cut sticks, pointed plates resting in close proximity to the sides of the cutter-head and passing through the slots in the knives, and a carrier-chain to which the sticks or splints are conveyed from the curved frame by the pointed plates, substantially as specified.

10. In a match-machine, a match-carrier consisting of a double series of links connected by pivotal rods, said links consisting of plates recessed at the ends and having the portions clamping or holding the splints bent alternately to one side and the other perpendicular, substantially as specified.

11. In a match-machine, a creaser consisting of a flexible belt protected by metal plates and a vertically-adjustable flanged wheel, said belt forming a support for a match-carrier, and the wheel resting on the sticks, substantially as specified.

12. Combined with a match-carrier chain having a double series of clamping-links, a creaser consisting of a flexible belt for the travel of said chain, and a wheel with a central and side peripheral flanges, substantially as specified.

13. In a match-machine, combined with a match-carrier, a heating-chamber containing heating-pipes and a central guiding-track for the match-carrier, substantially as specified.

14. In a match-machine, combined with a continuous match-conveyer, a heater consisting of a chamber with a central guiding-track for said conveyer, and a continuous heating-pipe arranged on each side of said track, substantially as specified.

15. Combined with a carrier-chain in a match-machine, a twisting guide for causing the same to dip the splints or sticks, consisting of two parallel strips sustained at an angle over a pan, one of the said strips having an upturned end and an intermediate flange or tongue, substantially as specified.

16. In a match-machine, a revolving composition-holder, combined with a match-carrier traveling above said holder, and twisting guides, whereby said carrier is turned to dip the matches directly into said holder, substantially as specified.

17. In a match-machine, a match-carrier, combined with a composition-holder revolving below said carrier at the same speed the carrier travels, and twisting guides, whereby the said carrier causes the matches to assume a perpendicular position when being dipped, substantially as specified.

18. In a match-machine, a match-carrier and twisting guides therefor, combined with a composition-holder arranged below said carrier and consisting of a revolving disk with a peripheral groove, and a pan surrounding said disk and containing heating-pipes, substantially as specified.

19. A revolving composition-holder combined with a funnel having an adjustable spout-opening and a surrounding water-receptacle, and a match-carrier conveying the splints or sticks to the composition, substantially as specified.

20. A composition-pan consisting of a disk with a peripheral groove, a pan surrounding the same and containing heating-pipes, and a funnel with an adjustable outlet and a surrounding water-receptacle, the whole combined with a match-carrier operating to dip the ends of the sticks or splints in the composition, substantially as specified.

21. A composition-pan consisting of a disk with a peripheral groove combined with a match-carrier dipping the ends of the sticks in the composition, combined with scrapers therefor, consisting of plates of suitable shape flexibly supported and normally engaging in said groove, substantially as specified.

22. A composition-holder consisting of a disk with a peripheral groove, scrapers consisting of plates of sutiable shape, partially squared spring-surrounded rods, to which said plates are secured, and an adjustable frame supporting said rods, combined with a carrier dipping the ends of the stick in the composition, substantially as specified.

23. In a match-machine, combined with the carrier-chain, a lateral sprocket-wheel, a guide-frame with a lateral flange, said guide engaging in front the chain, and a wedge resting back of the chain in close proximity to the said wheel, the whole causing the chain to turn sufficiently to dip the match perpendicularly, substantially as specified.

24. Combined with the match-carrier of a match-machine, a drier consisting of a series of parallel shafts having a common movement and carrying drums, said drums being arranged in twos (more or less) and placed on the said shafts at constantly increasing or decreasing distances from the corresponding ends thereof, whereby the carrier in passing over and around said drums has a forward and retrograde travel with a slow progression, substantially as specified.

25. In combination with a stick or splint carrier of a match-machine, a stationary cutter over which the said carrier automatically conveys the said sticks, substantially as specified.

26. Combined with the stick-carrier of a match-machine, a cutter consisting of a stationary saw-blade held by clamping-blocks, said blocks having each a longitudinal guiding-shoulder on its face, substantially as specified.

27. Combined with the stick-carrier of a match-machine, a cutter consisting of a saw-blade held by suitable clamp-blocks and having the amount of projection from said blocks gradually increased from the point of the commencement of the cut to the end thereof, substantially as specified.

28. Combined with the stick-carrier of a match-machine, a cutter consisting of a saw, holding-clamps with shoulders on the face flanking the saw-blade, and guides for the carrier which travels between said clamp and guides, substantially as specified.

29. Combined with the stick carrier and cutter of a match-machine, a sprocket-chain, one on each side of said cutter, having carrying-spurs on the links thereof, substantially as specified.

30. Combined with the carrier of a match-machine, a cutter for dividing the sticks into two pieces, a sprocket-gearing at the lower end thereof for said carrier, a curved frame under said gear, and a bracket having arms extending over said curved frame and guiding the sticks from said carrier, substantially as specified.

31. Combined with the carrier of a match-machine, a cutter for dividing the sticks into two pieces, auxiliary carriers on each side of said cutter, a curved supporting-frame at the lower end of said cutter, and a bracket with arms extending over said frame and guiding the cut sticks from the carriers, substantially as specified.

32. Combined with the carrier of a match-machine, a cutter consisting of a saw held by clamping-blocks with shoulders on their faces flanking said saw, guides parallel therewith and resting against the back of the carrier, auxiliary carriers on each side said cutter, a frame on which said cut sticks are deposited, and a bracket with arms resting over said frame and carrying said sticks from said carriers, substantially as specified.

33. In a match-machine, a box-carrier belt combined with the stick-carrier and a dividing-cutter, over which the carrier passes and which rests over the said belt, substantially as specified.

34. In a match-machine, a box-carrying belt consisting of a series of flexibly-connected lateral plates with central flanges and automatically-acting clamping-pieces near each end, said belt operating in connection with the match-dividing mechanism of the said machine, substantially as specified.

35. In a match-machine, a box-carrier consisting of a series of flexibly-connected lateral plates with central cross-flanges and slots near each end, and clamping-pieces projecting through said slots and having a spring connection one to the other, said belt operating in conjunction with the match-dividing mechanism of the said machine, substantially as specified.

36. Combined with the box-carrier of a match-machine, a supporting-shaft for the same carrying a ratchet-wheel, and a pawl-lever with a striking-head engaging with said wheel and with the said box-carrier, the whole operating in conjunction with the match-dividing mechanism of the machine, substantially as specified.

37. In a match-machine, combined with a match-divider, a box-carrying belt placed on an incline and frames extending from the divider to the lower end of the said carrier and at a distance above the same sufficient to allow the passage of the boxes, substantially as specified.

38. In a match-machine an inclined box-carrying belt, combined with a transmitting-belt and intervening platforms for making the two belts practically continuous, the whole operating in connection with the match-dividing mechanism of the machine, substantially as specified.

39. A match-machine having a box-carrying belt combined with the match-dividing mechanism, the boxes carried by the belt receiving the matches as they pass from said divider, substantially as specified.

40. A match-machine having a box-carrying belt, the boxes on which, while moving automatically, receive and retain the matches, combined with a match-dividing mechanism feeding the said matches to the boxes, substantially as specified.

41. A match-machine having as elements a box-carrying belt on which are boxes for receiving and retaining the finished matches and a tapping-lever intermittently engaging with said belt, combined with a match-dividing mechanism feeding the said matches to the boxes, substantially as specified.

42. A match-machine having an inclined box-carrying belt combined with the match-dividing mechanism, the boxes carried by the belt receiving the matches as they pass from said divider, substantially as specified.

43. In a match-machine, the combination of a match-carrier, a stationary cutter over which the match-carrier travels, and a box-carrier traveling under said cutter, substantially as specified.

44. In a match-machine, the combination of a match-carrier, a stationary cutter over which the match-carrier travels, and an inclined box-carrier traveling under said cutter, substantially as specified.

45. In a match-machine, the combination of a match-carrier, a cutter over which the said carrier travels, an inclined box-carrier under said cutter, a tapping-lever engaging with said box-carrier, and frames arranged parallel to and above said box-carrier, substantially as specified.

In testimony whereof I affix my signature in presence of two witnesses.

LEVI KITTINGER.

Witnesses:
ADA TRUNIE,
OLIVER P. FALOR.